No. 813,808. PATENTED FEB. 27, 1906.
M. I. LORYEA.
CAMERA ATTACHMENT.
APPLICATION FILED AUG. 30, 1905.

2 SHEETS—SHEET 1.

WITNESSES:
Geo. M. Naylor
Isaac B. Owens.

INVENTOR
Milton I. Loryea
BY
ATTORNEYS

No. 813,808. PATENTED FEB. 27, 1906.
M. I. LORYEA.
CAMERA ATTACHMENT.
APPLICATION FILED AUG. 30, 1905.
2 SHEETS—SHEET 2.
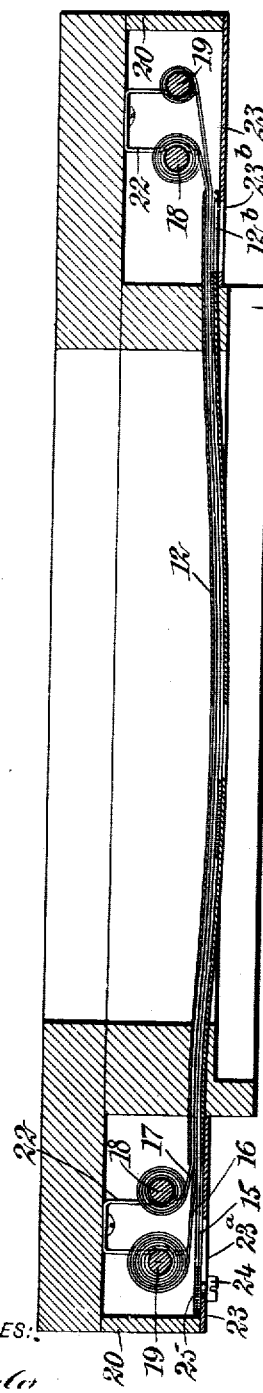
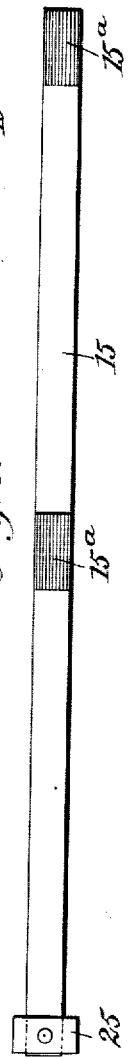
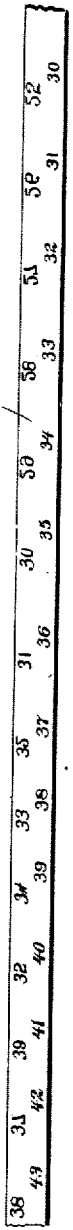
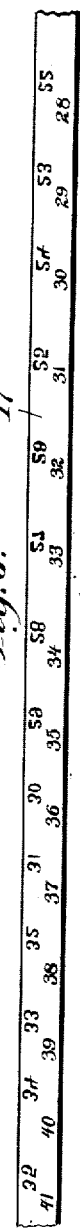
WITNESSES:
INVENTOR
Milton I. Loryea
BY
ATTORNEYS

UNITED STATES PATENT OFFICE.

MILTON ISAAC LORYEA, OF SPOKANE, WASHINGTON.

CAMERA ATTACHMENT.

No. 813,808.  Specification of Letters Patent.  Patented Feb. 27, 1906.

Application filed August 30, 1905. Serial No. 276,440.

*To all whom it may concern:*

Be it known that I, MILTON ISAAC LORYEA, a citizen of the United States, and a resident of Spokane, in the county of Spokane and State of Washington, have invented a new and Improved Camera Attachment, of which the following is a full, clear, and exact description.

The object of the invention is to provide a camera with a convenient means by which plates exposed in the camera may be numbered or otherwise marked for identification. I attain this end by a peculiar arrangement of transparent tape or tapes having numbers thereon, which numbers are photographed onto the plates at the same time that the plates are exposed before the object to be photographed.

The invention involves various features of major or minor importance, all of which will be fully set forth hereinafter, and particularly pointed out in the claims.

Reference is to be had to the accompanying drawings, which illustrate, as an example, the preferred embodiment of my invention, and in which—

Figure 1:
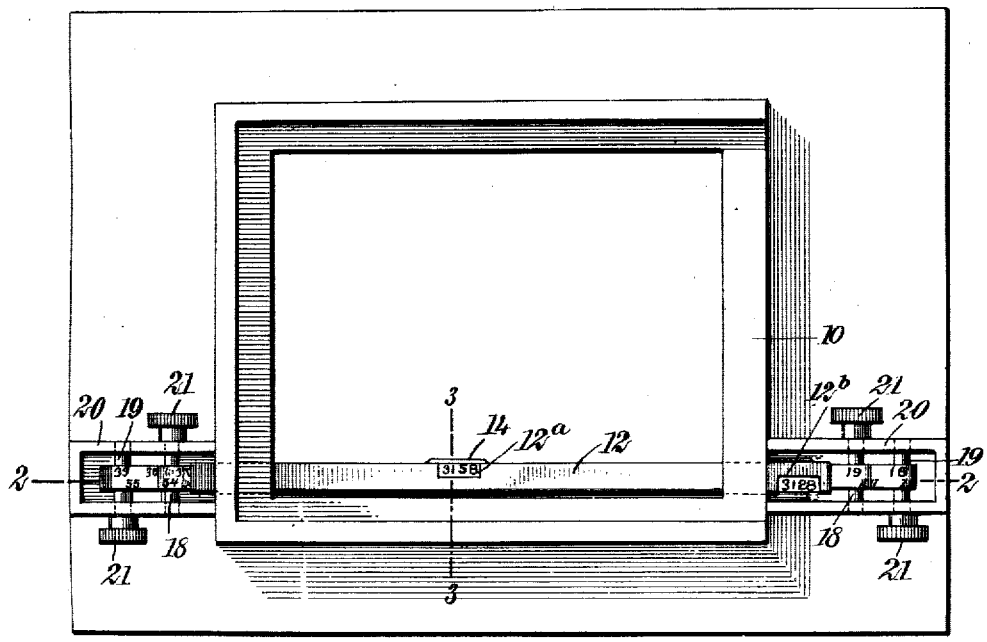
Figure 3:
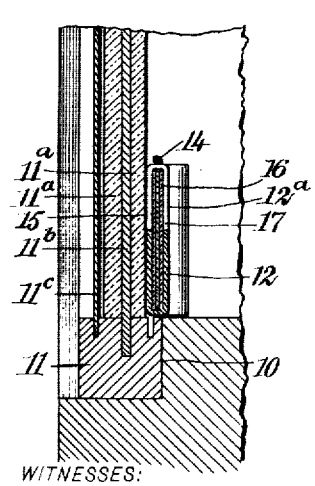
Figure 9:
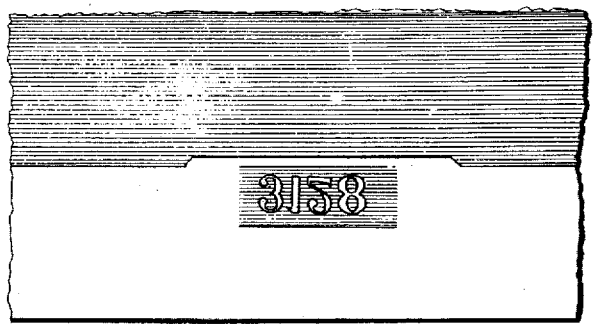
Figure 8:
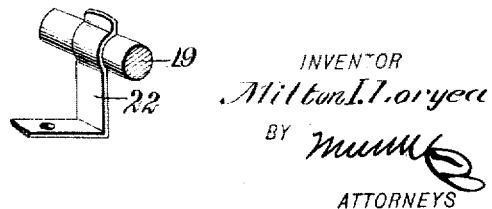

Figure 1 is a rear elevation of the camera, showing my improvement applied. Fig. 2 is an enlarged horizontal section on the line 2 2 of Fig. 1. Fig. 3 is a detail section on the line 3 3 of Fig. 1. Fig. 4 is a detail view showing the shutter-tape. Figs. 5 and 6 are detail views showing the numbering-tape. Fig. 7 is a fragmentary view showing the tape superimposed and illustrating the manner in which numbers are formed. Fig. 8 is a detail view showing the tension device for the tape-rolls, and Fig. 9 is a view showing the plate after exposure.

In Figs. 1, 2, and 3, 10 indicates a slideway for the reception of the plate-holder. In Fig. 3 the plate-holder 11 is illustrated in position, $11^a$ indicating the two plates separated by a partition $11^b$ and adapted to be covered by opaque sheets, one of which is indicated at $11^c$ in the figure. Mounted at the back of the camera directly in front of the said slideway 10 is a flattened tube 12, which is bowed and slightly resilient, so that as the plate-holder 11 is slid into position the bowed portion of the tube 12 will be engaged, and said portion will press itself firmly against the plate, allowing the number or other identifying character, as will be hereinafter explained, to be clearly impressed upon the plate. Said flattened tube 12 is provided at or approximately at its middle with an opening $12^a$, and this is spanned by a bridge-rod 14, which serves to strengthen the tube at this point. The tube 12 extends beyond each side of the opening at the back of the camera, and at one of its extended ends, preferably the right-hand end, (shown best in Fig. 1,) said tube is provided with a second opening $12^b$. The openings $12^a$ and $12^b$ are arranged out of line with each other, the former opening being at the upper edge of the tube and the latter being at the lower edge. Arranged to slide freely in the tube 12 are three tapes, (designated 15, 16, and 17, respectively.) These tapes are formed of celluloid or other transparent material. The tape 15 may be termed the "shutter-tape," since it is intended to blank the openings $12^a$ and $12^b$, preventing the number from being reproduced on the plate and also preventing observation of the tapes 16 and 17 through the openings $12^b$. To effect this end, the shutter-tape 15 is provided with opaque portions $15^a$, and the tape may be moved so that the opaque portion $15^a$ will cover, respectively, the openings $12^a$ and $12^b$, preventing the number or other identifying character from being impressed upon the plate and also preventing the operator from observing any number through the opening $12^b$. The tapes 16 and 17 are provided with two sets of numbers, as shown best in Figs. 5 and 6. Of these numbers the upper line on each tape is inverted, while the lower line on each tape reads correctly. The tapes being superimposed, the upper lines of the tapes read together and are exposed through the opening $12^a$, while the lower lines read together and are visible through the opening $12^b$. By relative adjustment of the tapes a wide range of compound figures may be made to appear through the openings $12^a$ and $12^b$, and by properly adjusting the numbers on the tapes the same numbers may be exposed through each opening, the number appearing through the opening $12^a$ being inverted and the number appearing through the opening $12^b$ reading correctly. The opening $12^b$ furnishes, therefore, an index or observation opening enabling the operator quickly to see just what number is exposed through the opening $12^a$. When the film or plate is exposed to the photographic process, the number exposed at the opening $12^a$ will be correctly photographed on the plate.

For example, in Fig. 1 it may be seen that the number "3128" is exposed through the opening 12$^b$. Through the opening 12$^a$ the same number is exposed in inverted position. By a further adjustment of the tapes 16 and 17 a different number may be made to appear through both of these openings. Fig. 9 shows a fragment of the plate after exposure, and it will be seen that the number "3128" is produced on the margin of the plate. Fig. 9 shows the reverse side of the plate, and the number therefore appears reversely. On the opposite or obverse side of the plate the number will read correctly. In Fig. 7 the plates 16 and 17 are shown superimposed, and this view clearly illustrates how the compound numbers are formed by the two transparent tapes.

The tapes 16 and 17 have their ends wound on rollers 18 and 19, these being mounted in boxes 20, formed at the back of the camera, and the rollers being provided with thumb-wheels 21, facilitating the operation of the rollers. Said rollers are also provided with tension-springs 22, which hold the rolls against idle movement. The boxes 20 have cover-plates 23, and one of these plates is provided with a slot 23$^a$, through which a pin or screw 24 passes, said pin or screw 24 being in connection through the medium of a clip 25 with one end of the tape 15 and furnishing a means for shifting this tape at will. The other cover 23 has an opening 23$^b$ therein, which exposes the before-mentioned opening 12$^b$ in the flattened tube 12.

In the operation of the invention the thumb-wheels 21 should be adjusted to show the desired number through the opening 12$^b$, the operator thus knowing what number is exposed through the opening 12$^a$, notwithstanding that the plate may be behind said opening, and prevent the operator from observing the number exposed at this point. After this is done the plate may be exposed in the usual manner, the result being that the number is produced on the plate, as shown in Fig. 9, and as has been previously explained. When the next picture is to be taken, a further adjustment of the thumb-wheel should be made so as to show the next consecutive number. In this manner all of the plates exposed in the camera may be successively numbered and thus thoroughly identified. It is obvious that the invention is not limited to the use of numbers and that other identifying characters may be employed. It is preferable to employ consecutive numbers. Should it be desired not to produce the number on the plate, the thumb-pin 24 should be adjusted so as to move the opaque portion 15$^a$ of the tape 15 over the openings 12$^a$ and 12$^b$, thus covering the number which is exposed through the opening 12$^a$, and since the opening 12$^b$ is covered the operator is informed that the opening 12$^a$ is also blank and that the plate which is about to be exposed will not have a number produced thereon. By partly shifting the tape 15 the number may be partly covered, and in this way additional combinations of numbers may be made so that by providing the two tapes with two sets of numbers thereon a great number of combinations may be made.

Having thus described the preferred form of my invention, what I claim as new, and desire to secure by Letters Patent, is—

1. A camera attachment having a plurality of transparent tapes capable of relative adjustment, for the purpose specified, the said tapes having characters thereon adapted to be exposed to the photographic plate in the camera.

2. A camera attachment having a plurality of relatively adjustable transparent tapes, each having two sets of characters thereon, and a means in which said tapes are guided and inclosed, said means having two openings respectively adapted to expose the sets of characters on the tapes.

3. A camera attachment having a plurality of relatively adjustable transparent tapes, each having two sets of characters thereon, a means in which said tapes are guided and inclosed, said means having two openings respectively adapted to expose the sets of characters on the tapes, and a shutter device for the said openings.

4. A camera attachment having a plurality of relatively adjustable transparent tapes, each having two sets of characters thereon, a means in which said tapes are guided and inclosed, said means having two openings respectively adapted to expose the sets of characters on the tapes, and a shutter-tape movable in said means for inclosing the first-mentioned tapes, the shutter-tape having opaque portions adapted to close said openings.

5. A camera attachment having a flattened tube extending across the rear of the camera, in front of the plate, said tube having an opening therein, and a transparent tape having characters thereon, the tape being inclosed in the tube, and the opening serving to expose one or more of the characters.

6. A camera attachment having a flattened tube extending across the rear of the camera in front of the plate, and a plurality of transparent tapes movable through the tube, said tube having an opening therein, and the tapes having characters thereon adapted to be exposed through the opening.

7. A camera attachment having a flattened tube extending across the rear of the camera in front of the plate, a plurality of transparent tapes movable through the tube, said tube having an opening therein, and the tapes having characters thereon adapted to be exposed through the opening, and a shutter-tape adjustable in the tube and having an opaque portion adapted to be moved opposite the opening in the tube, for the purpose specified.

8. A camera attachment having a tube extending across the rear of the camera in front of the plate position, said tube having an opening opposite the plate position and an opening at one end portion, and the openings being out of longitudinal alinement with each other, and relatively adjustable transparent tapes located in the tube and each having two sets of numbers thereon, which sets of numbers are respectively visible through the openings in the tube.

9. A camera attachment comprising a tube extending across the rear of the camera in front of the plate position, and formed with an opening therein opposite the plate position and a second opening in one end portion of the tube, and a tape adjustable in the tube and having two sets of numbers thereon, the openings in the tube being out of longitudinal alinement and serving respectively to expose the sets of numbers on the tape.

10. A camera attachment comprising a tube extending across the rear of the camera in front of the plate position, and formed with an opening therein opposite the plate position and a second opening in one end portion of the tube, a tape adjustable in the tube and having two sets of numbers thereon, the openings in the tube being out of longitudinal alinement and serving respectively to expose the sets of numbers on the tape, and a shutter-tape adjustable in the tube and having opaque portions adapted to cover said openings therein.

11. A camera attachment having a tube extending across the rear of the camera in front of the plate position, said tube having an opening therein opposite the plate position, transparent tapes having numbers thereon adapted to slide in the tube, and rolls located at the ends of the tube and having said tapes wound thereon.

12. A camera attachment having a tube extending across the rear of the camera in front of the plate position, said tube having an opening therein opposite the plate position, transparent tapes having numbers thereon adapted to slide in the tube, rolls located at the ends of the tube and having said tapes wound thereon, a box inclosing the rolls at one end of the tube, a member sliding in one wall of the box, and a shutter-tape adjustable in the tube and connected with said sliding member.

In testimony whereof I have signed my name to this specification in the presence of two subscribing witnesses.

MILTON ISAAC LORYEA.

Witnesses:
M. B. CONNELLY,
R. L. WEBSTER.